United States Patent
Armolavicius et al.

(10) Patent No.: US 9,838,296 B2
(45) Date of Patent: Dec. 5, 2017

(54) BANDWIDTH OPTIMIZATION SYSTEMS AND METHODS IN NETWORKS

(71) Applicant: Ciena Corporation, Hanover, MD (US)

(72) Inventors: Romualdas Armolavicius, Ottawa (CA); Todd Morris, Sittsville (CA); Norman Steven Traxler, Ottawa (CA); Jie Jenny Qin, Ottawa (CA)

(73) Assignee: Ciena Corporation, Hanover, MD (US)

( * ) Notice: Subject to any disclaimer, the term of this patent is extended or adjusted under 35 U.S.C. 154(b) by 64 days.

(21) Appl. No.: 14/919,251

(22) Filed: Oct. 21, 2015

(65) Prior Publication Data
US 2016/0182329 A1    Jun. 23, 2016

Related U.S. Application Data

(60) Provisional application No. 62/094,677, filed on Dec. 19, 2014.

(51) Int. Cl.
*H04L 12/28* (2006.01)
*H04L 12/751* (2013.01)
*H04L 12/24* (2006.01)

(52) U.S. Cl.
CPC ............ *H04L 45/02* (2013.01); *H04L 41/082* (2013.01); *H04L 41/0893* (2013.01); *H04L 41/0896* (2013.01); *H04L 41/147* (2013.01)

(58) Field of Classification Search
CPC combination set(s) only.
See application file for complete search history.

(56) References Cited

U.S. PATENT DOCUMENTS

| | | | |
|---|---|---|---|
| 8,670,315 B1 | 3/2014 | Armolavicius | |
| 9,350,671 B2 * | 5/2016 | Zou | H04L 47/19 |
| 2013/0209091 A1 | 8/2013 | Mateosky et al. | |
| 2013/0250770 A1 | 9/2013 | Zou et al. | |
| 2013/0329601 A1 | 12/2013 | Yin et al. | |
| 2014/0361686 A1 | 12/2014 | Wolfe | |
| 2015/0029846 A1 * | 1/2015 | Liou | H04L 47/122 370/230.1 |

(Continued)

OTHER PUBLICATIONS

Rodrigues et al, Traffic Optimization in Multi-Layered WANs using SDN, IEEE, 9 pages, Aug. 2014.*

(Continued)

*Primary Examiner* — Frank Duong
(74) *Attorney, Agent, or Firm* — Clements Bernard Walker PLLC; Christopher L. Bernard; Lawrence A. Baratta, Jr.

(57) ABSTRACT

Systems and methods for bandwidth optimization in a network include monitoring a state of the network, wherein the network is a connection-oriented network; utilizing analytics based on the monitoring to predict trends, create triggers, and determine updates to policy associated with the network; and performing bandwidth optimization on one or more connections based on the trends, the triggers, and the policy, wherein each of the one or more connections has one or more of a Wave Division Multiplexing (WDM) component, a Time Division Multiplexing (TDM) component, and a packet component, and wherein the bandwidth optimization finds the one or more connections with inefficient resource usages and moves the one or more connections, in one or more of time and space, to more optimal paths.

18 Claims, 8 Drawing Sheets

(56) References Cited

U.S. PATENT DOCUMENTS

2015/0127805 A1    5/2015  Htay et al.
2015/0188774 A1*   7/2015  Nadaf .................. H04L 41/145
                                                                 709/223
2015/0334002 A1*  11/2015  Jogalekar ............ H04L 47/12
                                                                 370/238

OTHER PUBLICATIONS

Wu, "A survey of WDM network reconfiguration: Strategies and triggering methods", Computer Networks 55 (2011), pp. 2622-2645.
"Open Flow Switch Specification", Open Networking Foundation, Mar. 26, 2015, pp. 1-283.
Mannie, "Generalized Multi-Protocol Label Switching (GMPLS) Architecture", Network Working Group, Oct. 2004, pp. 1-69.
"Architecture for the automatically switched optical network," International Telecommunication Union, Feb. 2012, pp. 1-124.

\* cited by examiner

BANDWIDTH OPTIMIZATION SYSTEMS AND METHODS IN NETWORKS

CROSS-REFERENCE TO RELATED APPLICATION(S)

The present patent/application claims priority to U.S. Patent Application No. 62/094,677, filed on Dec. 19, 2014, and entitled "BANDWIDTH DEFRAGMENTATION SYSTEMS AND METHODS IN NETWORKS," the contents of which are incorporated by reference.

FIELD OF THE DISCLOSURE

The present disclosure generally relates to networking systems and methods. More particularly, the present disclosure relates to bandwidth optimization systems and methods in networks.

BACKGROUND OF THE DISCLOSURE

In the past, networks, such as networks at Layers 0, 1, 2, and/or 3, only provided services to long-term static end-to-end connections. In networks, the services can be provisioned through Layer 0 (Wave Division Multiplexing (WDM)) and Layer 1 (Time Division Multiplexing (TDM)) connections. Networks are increasingly supporting on-demand services with dynamic connections. These on-demand connections will have varied durations and bandwidth requirements and may be scheduled in advance or may arrive spontaneously. Ongoing connection arrivals and releases lead to less than ideal resource utilization over time: a connection which used resources optimally when it was established may no longer be optimally routed as a result of capacity that is freed by subsequent connection releases. The resulting stranded bandwidth results in poorer network utilization, over time, and ultimately higher network cost.

Conventional network reconfiguration includes various reconfiguration triggers, periodicity, and grooming in both static and dynamic loads, and a survey of conventional techniques is described in Jing Wu, "A Survey of WDM network reconfiguration: Strategies and Triggering Methods", Computer Networks 55 (2011) 2622-2645. Existing approaches to the bandwidth optimization also applied to quasi-static transport networks that changed state slowly as opposed to the rapidly evolving dynamic network. Historically linear or integer programming techniques were used as the basis of reconfiguration algorithms. Historically, reconfiguration did not consider scheduled connections or the associated optimizations moving connections in time as well as space.

Optical transport networks, for example, previously supported long-term static end-to-end connections. This is changing with the introduction of SDN and with its use for dynamic connections. Dynamic connections have both varied bandwidth requirements and durations. Connection requests and releases will occur with varying rates and often randomly both in location and in time. No mechanism currently exists within SDN to ensure that the utilization of network resources does not degrade as it responds to dynamically changing loads thereby reducing capacity and ultimately increasing the operators' costs. The highly variable and typically unpredictable arrival and release of dynamic connections will from-time-to-time exceed the capacity of the network. Simulation studies have shown that overloads can lead to a capacity collapse where connections are established with inefficient paths that waste resources.

BRIEF SUMMARY OF THE DISCLOSURE

In an exemplary embodiment, a method, implemented on a server or processing device, for bandwidth optimization in a network includes monitoring a state of the network, wherein the network is a connection-oriented network; utilizing analytics based on the monitoring to predict trends, create triggers, and determine updates to policy associated with the network; and performing bandwidth optimization on one or more connections based on the trends, the triggers, and the policy, wherein each of the one or more connections has one or more of a Wave Division Multiplexing (WDM) component, a Time Division Multiplexing (TDM) component, and a packet component, and wherein the bandwidth optimization finds the one or more connections with inefficient resource usages and moves the one or more connections, in one or more of time and space, to more optimal paths. The network can utilize Software Defined Networking (SDN) control, and the method can be performed by one of an SDN controller and an SDN application. The one or more connections can be any of existing connections, scheduled connections, and forecasted connections. Inputs for the monitoring can include a topology of the network, a connection state for connections in the network, historical traffic data, and the policy including how to filter and select the one or more connections and when to terminate the bandwidth optimization. The monitoring can be one or more of passive monitoring and active monitoring. The trends can be predicted based on historical traffic data to determine traffic predictions and the traffic predictions can be used by the bandwidth optimization to determine relocation of the one or more connections, wherein the triggers can be generated in response to one or more of changes in network topology and capacity and the triggers are used to determine when the bandwidth optimization is performed, and wherein the updates to the policy can include updates, based on analytics, to filtering and selection of the one or more connections and when to terminate the bandwidth optimization. The bandwidth optimization can add temporary resources in the network to accommodate moves of the one or more connections. The bandwidth optimization can include sorting candidate connections in a candidate set; for each of the candidate connections, determining if a move improves network resources; and performing one or more passes over the candidate set. The bandwidth optimization can include, for each candidate connection in a candidate set, moving to an ideal path by first clearing enough resources from the path to permit the moving; and effecting all of the moving if total resources are decreased. The network can include one or more of a plurality of domains and a plurality of layers.

In another exemplary embodiment, an apparatus configured to perform bandwidth optimization in a network includes a network interface and a processor communicatively coupled to one another; and memory storing instructions that, when executed, cause the processor to monitor a state of the network via the network interface, wherein the network is a connection-oriented network, utilize analytics based on the state to predict trends, create triggers, and determine updates to policy associated with the network, and determine bandwidth optimization on one or more connections based on the trends, the triggers, and the policy, wherein each of the one or more connections has one or more of a Wave Division Multiplexing (WDM) component, a Time Division Multiplexing (TDM) component, and a packet component, and wherein the bandwidth optimization finds the one or more connections with inefficient resource usages and moves the one or more connections, in one or more of time and space, to more optimal paths. The network can utilize Software Defined Networking (SDN) control, and the method can be performed by one of an SDN controller and an SDN application. The one or more connections can be any of existing connections, scheduled connections, and forecasted connections. Inputs to monitor the state can include a topology of the network, a connection state for connections in the network, historical traffic data, and the policy including how to filter and select the one or more connections and when to terminate the bandwidth optimization. The trends can be predicted based on historical traffic data to determine traffic predictions and the traffic predictions are used by the bandwidth optimization to determine relocation of the one or more connections, wherein the triggers can be generated in response to one or more of changes in network topology and capacity and the triggers are used to determine when the bandwidth optimization is performed, and wherein the updates to the policy can include updates, based on analytics, to filtering and selection of the one or more connections and when to terminate the bandwidth optimization. The bandwidth optimization can add temporary resources in the network to accommodate moves of the one or more connections. To perform the bandwidth optimization, the memory storing instructions that, when executed, further cause the processor to sort candidate connections in a candidate set, for each of the candidate connections, determine if a move improves network resources, and perform one or more passes over the candidate set. To perform the bandwidth optimization, the memory storing instructions that, when executed, further cause the processor to, for each candidate connection in a candidate set, move to an ideal path by first clearing enough resources from the path to permit the moving, and cause movement to the ideal paths if total resources are decreased. The network can include one or more of a plurality of domains and a plurality of layers.

In a further exemplary embodiment, a Software Defined Networking (SDN) network includes a plurality of network elements interconnected to one another; an SDN controller communicatively coupled to one or more of the plurality of network elements; and an SDN application executed on a processor configured to monitor a state of the network based on communication with the SDN controller, wherein the network is a connection-oriented network, utilize analytics based on the state to predict trends, create triggers, and determine updates to policy associated with the network, and determine bandwidth optimization on one or more connections based on the trends, the triggers, and the policy, wherein each of the one or more connections has one or more of a Wave Division Multiplexing (WDM) component, a Time Division Multiplexing (TDM) component, and a packet component, and wherein the bandwidth optimization finds the one or more connections with inefficient resource usages and moves the one or more connections, in one or more of time and space, to more optimal paths.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
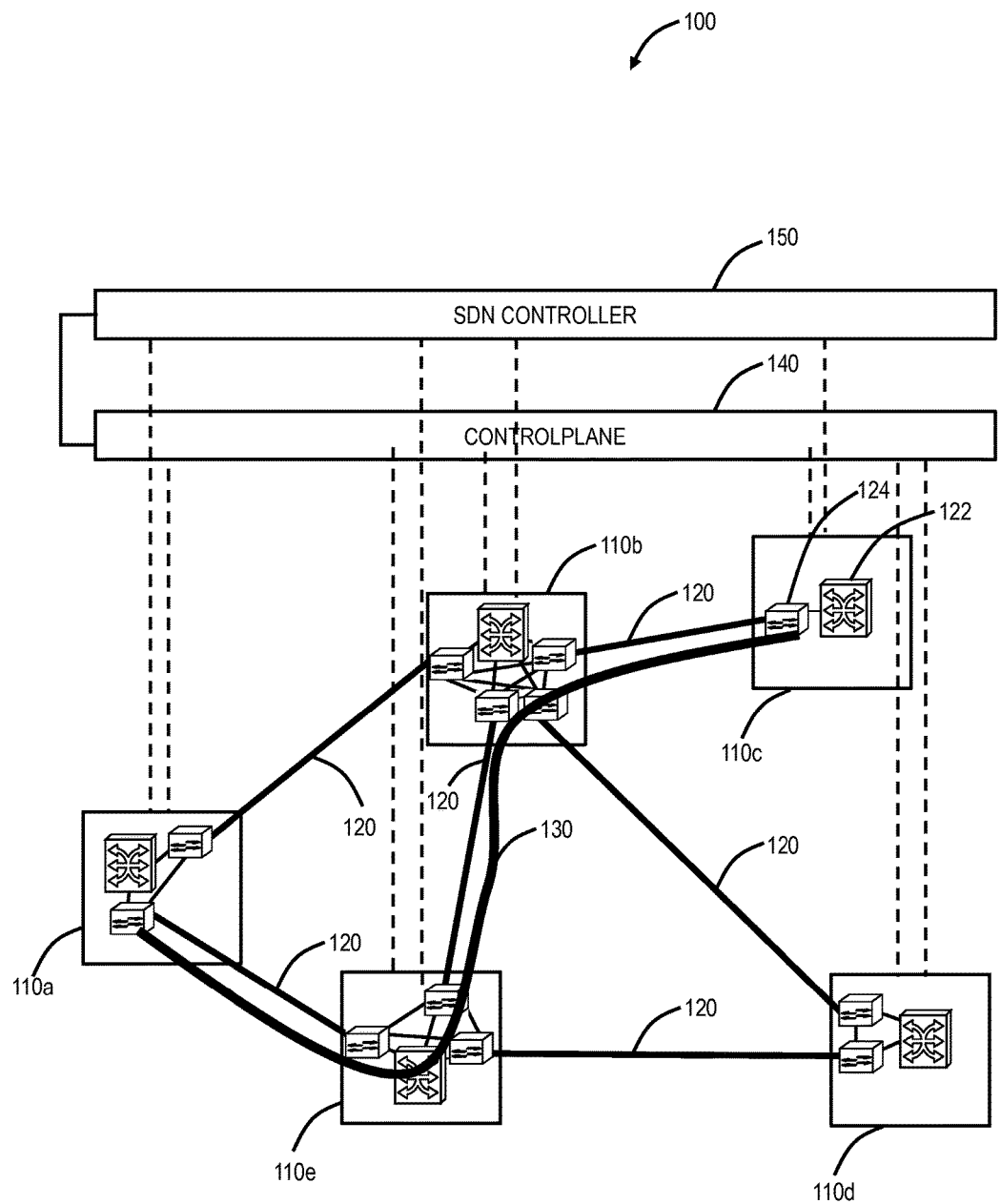
FIG. 1 is a network diagram of an exemplary network with five interconnected sites.

In various exemplary embodiments, bandwidth optimization systems and methods are described in networks. The systems and methods can restore a network to an optimal or near optimal state with respect to resource utilization. The systems and methods operate by finding candidate connections with inefficient resource allocation and by re-establishing them so that they use resources more effectively. The candidate connections can be moved in space (to use a different path) and/or in time (starting earlier or later). The candidate connections can be existing connections or connections that are scheduled but not yet in progress or even connections that are expected to arrive based on traffic forecasts and are allocated resources on that basis. These candidate connections can be discovered through a combination of path computation algorithms and filtering criteria that assess the benefit of moving a given connection.

The systems and methods can be triggered either by a schedule or as a result of network events such as blocked connection requests, "test calls", or changes of network state such as link utilization levels exceeding thresholds. The systems and methods optimize the recovered bandwidth per connection moved by assigning higher priority to moving connections that have a higher resource cost. Connections may be assigned a higher cost if they use more instantaneous bandwidth, if they use more instantaneous bandwidth summed over their hops (hops are equivalent to links), or if they are expected to use more bandwidth over their lifetime. The systems and methods can also compare the resource cost of a connection to its minimum resource requirements in an otherwise empty network, and order moves based on how much a connection exceeds its minimum cost.

The systems and methods allow the number of connections moved to be selected to achieve the maximum desired impact while limiting the work required and disruption to customer data flows. A full run would move all connections in the candidate list and stop only if no connection remaining in the list can be moved. Early termination could stop further moves once a numeric move target has been reached or after the total bandwidth reclaimed exceeds a threshold. The systems and methods permit multiple runs on the candidate connection list maximizing the probability that bandwidth freed by a connection move can be re-used by a candidate that could not be moved on an earlier pass. The systems and methods can use analytics to filter move candidates, performing cost/benefit tradeoffs and related complexity analysis, formulating optimization algorithm termination criteria, and formulating optimization triggers.

For the optimization, the candidate connections can be sorted by the quantity of various resources used; each candidate connection can be examined in order with a move enabled if the total (post-move) resources are decreased. The alternative path would be determined by a path computation algorithm operating on the current network state. Multiple passes over the candidate connection set may be used and the number of connections moved per pass can be limited. Pass and move limits can be fixed or determined by analytics (for example, once a resources-recovered target is met). Alternatively, a novel "path clearing" algorithm can be used which includes: each candidate connection is moved to its ideal path by first clearing enough resources from this path to permit the move; all of the moves would be effected if the total resources used would be decreased. Otherwise the connections "pushed aside" would be restored. This path clearing algorithm can be made fully recursive to arbitrary depth or as limited by analytics. Moves can be effected in real time on the working network or in an offline planning mode to permit subsequent follow-up.

The systems and methods allow a network to be operated at a higher utilization for an equivalent level of performance (blocking of connection requests) and is therefore capable of generating greater revenue than would otherwise be possible with the installed equipment base. Effective capacity increases of 20% or more over ungroomed networks have been observed in simulation studies using real customer networks. The systems and methods can operate with existing path computation algorithms as well as with improved algorithms that are designed to use connection resources more efficiently. The systems and methods order connection moves enabling greater bandwidth recovery early in the operation of the algorithm, allowing flexible control of the benefit to cost tradeoff through early termination of the algorithm.

Again, the systems and methods support both spatial and/or temporal moves for optimization. Temporary resources (as identified by network analytics) can be provided to supplement network resources providing additional (temporary) routes that the optimization can take advantage and after which the capacity could be released. The use of this temporary capacity as a "parking lot" can improve the outcome of optimization by enabling moves that would not otherwise be possible due to lack of resources. In an exemplary embodiment, temporary capacity could be provided using capacity mining techniques enabled by flexible optical modems (one such example is Liquid Spectrum based on Ciena Corporation's WaveLogic system).

The systems and methods can include various optimization trigger mechanisms including passive monitoring (for example, metrics such as instantaneous blocking exceeding thresholds); active monitoring of network analytics (such as the results from synthetic test calls); predictive analytics that indicate, for example, that congestion is expected in certain parts of the network; periodic optimization that could be deferred if network analytics determine there would be insufficient benefit from optimization at that time; and the like. The optimization can be across multiple domains and/or multiple layers. End-to-end connections could traverse multiple network domains with multiple layers, each managed by the same or different operators. The systems and methods can be applied to each domain/layer individually without the use of any additional mechanisms as well as applied in conjunction with a multi-domain/multi-layer controller or orchestrator without the use of any additional mechanisms if multi-domain/multi-layer path computation is available. A hierarchical form can be applied in conjunction with a multi-domain/multi-layer controller or orchestrator without multi-domain/multi-layer path computation being available.

Again, the systems and methods use analytics to identify the best candidate connections to move in a dynamic network. It also uses analytics to determine when to perform the optimization and how aggressively to optimize (how many connections to move) to achieve the best cost/benefit tradeoff. The optimizations are based on novel optimization algorithms that use the path computation algorithms provided by network domain controllers as primitive elements. This allows a simple extension of the algorithms to multiple domains and layers. Extensive simulation studies using realistic networks have unequivocally demonstrated the ability of these systems and methods to improve network efficiency and to increase the amount of traffic that networks can carry at a given level of service (blocking probability).

Exemplary Network

Referring to FIG. 1, in an exemplary embodiment, a network diagram illustrates an exemplary network 100 with five interconnected sites 110a, 110b, 110c, 110d, 110e. The sites 110 are interconnected through a plurality of links 120. Each of the sites 110 can include a switch 122 and one or more WDM network elements 124. The switch 122 is configured to provide services at Layers 1 (e.g., OTN/SONET/SDH) and/or Layer 2 (e.g., Ethernet). The WDM network elements 124 provide the photonic layer (e.g., Layer 0) and various functionality associated therewith (e.g., multiplexing, amplification, optical routing, wavelength conversion/regeneration, local add/drop, etc.) including photonic control. Of note, while shown separately, those of ordinary skill in the switch 122 and the WDM network elements 124 may be realized in the same network element. The photonic layer and the photonic control operating thereon can also include intermediate amplifiers and/or regenerators on the links 120 which are omitted for illustration purposes. The network 100 is illustrated, for example, as an interconnected mesh network, and those of ordinary skill in the art will recognize the network 100 can include other architectures, with additional sites 110 or with fewer nodes sites, with additional network elements and hardware, etc. The network 100 is presented herein as an exemplary embodiment for the implementing the bandwidth optimization systems and methods. Also, note the network 100 is a connection-oriented network (at least in part) including optical and TDM components.

The sites 110 communicate with one another optically over the links 120. The sites 110 can be network elements which include a plurality of ingress and egress ports forming the links 120. Further, the nodes 110 can include various degrees, i.e. the site 110c is a one-degree node, the sites 110a, 110d are two degree nodes, the site 110e is a three degree node, and the site 110b is a four degree node. The number of degrees is indicative of the number of adjacent nodes at each particular node. The network 100 is illustrated with a connection 130 between the sites 110a, 110c and through the sites 110b, 110e. The connection 130 can be a subnetwork connection (SNC), label switched path (LSP), or any other end-to-end connection that can optimize with the bandwidth optimization systems and methods. Further, the connection 130 can include various different aspects such as a wavelength, TDM traffic, packet traffic, and a combination therein.

The foregoing descriptions focus on L0/L1 aspects of the network 100. That is, the bandwidth optimization systems and methods provide optimization on connections in the network 100 with the connections having TDM and/or WDM components (i.e., L0 and/or L1 resources). Additionally, the network 100 can include other components forming L2 and/or L3 connections in the network 100 such as routers, switches, packet-optical transport systems, and the like. That is, the network 100 can include Ethernet, Virtual Local Area Network (VLAN), Multilayer Protocol Switching (MPLS), Internet Protocol, etc. connections as well. In an exemplary embodiment, the bandwidth optimization systems and methods can operate at a single Layer (L0, L1, L2, or L3), and in another exemplary embodiment, the bandwidth optimization systems and methods can operate simultaneously at multiple layers.

The network 100 can include a control plane 140 operating on and/or between the switches 122 at the sites 110a, 110b, 110c, 110d, 110e. The control plane 140 includes software, processes, algorithms, etc. that control configurable features of the network 100, such as automating discovery of the switches 122, capacity of the links 120, port availability on the switches 122, connectivity between ports; dissemination of topology and bandwidth information between the switches 122; calculation and creation of paths for connections; network level protection and restoration; and the like. In an exemplary embodiment, the control plane 140 can utilize Automatically Switched Optical Network (ASON), Generalized Multiprotocol Label Switching (GMPLS), Optical Signal and Routing Protocol (OSRP) (from Ciena Corporation), or the like. Those of ordinary skill in the art will recognize the network 100 and the control plane 140 can utilize any type control plane for controlling the switches 122 and establishing connections.

The network 100 can also include a Software Defined Networking (SDN) controller 150. In an exemplary embodiment, the SDN controller 150 and the control plane 140 can work together. In another exemplary embodiment, the SDN controller 150 can operate independently with or without the control plane 140. In a further exemplary embodiment, the SDN controller 140 may be omitted. That is, the network 100 contemplates distributed control via the control plane 150, centralized control via the SDN controller 150, or a combination thereof. SDN allows management of network services through abstraction of lower level functionality. This is done by decoupling the system that makes decisions about where traffic is sent (SDN control through the SDN controller 150) from the underlying systems that forward traffic to the selected destination (i.e., the physical equipment in the network 100). Work on SDN calls for the ability to centrally program provisioning of forwarding on the network 100 in order for more flexible and precise control over network resources to support new services. The SDN controller 150 is a processing device that has a global view of the network 100. Additionally, the SDN controller 150 can include or connect to SDN applications which can utilize the data from the SDN controller 150 for various purposes. In an exemplary embodiment, the SDN applications include the bandwidth optimization systems and methods which are described in detail herein.

On-Demand Services

Figure 2:
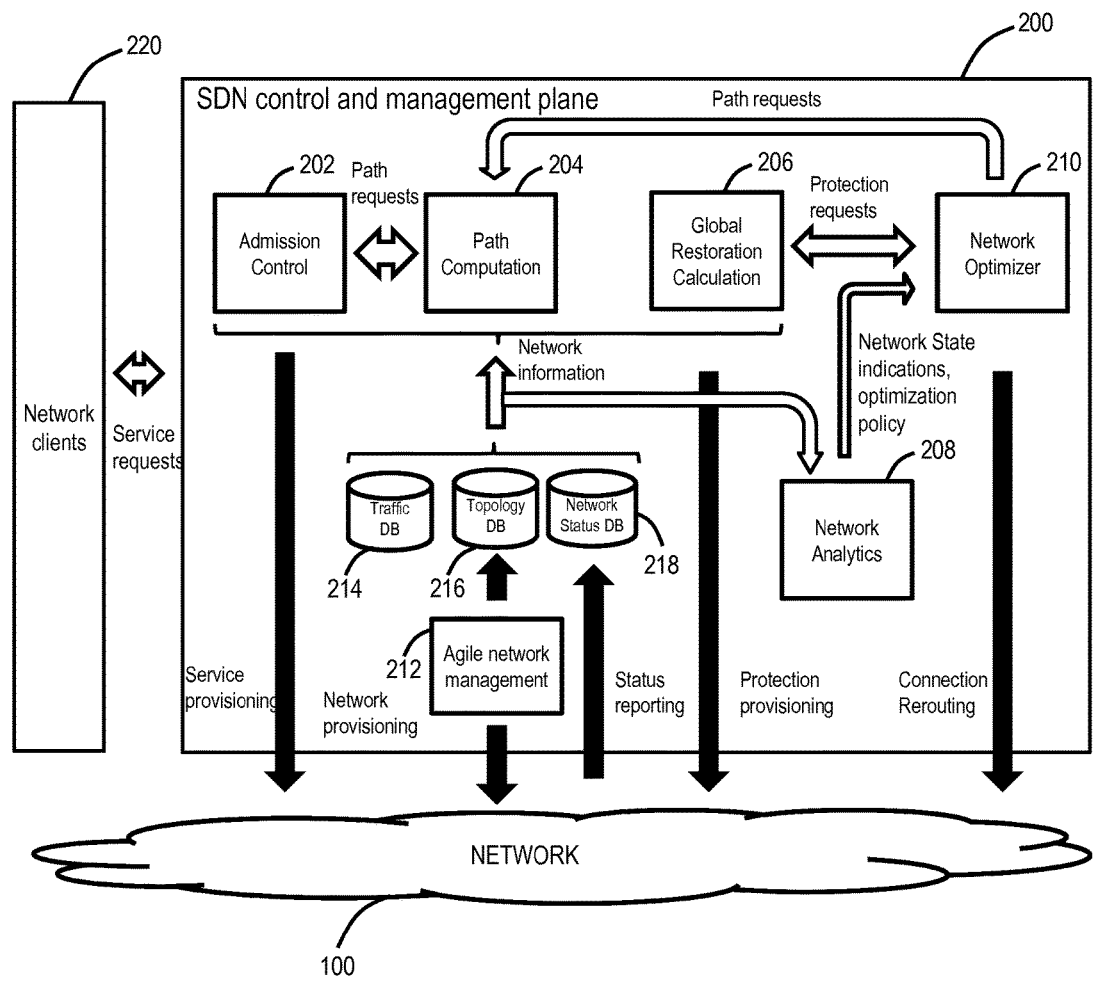
FIG. 2 is a block diagram of an SDN control and management plane.

Referring to FIG. 2, in an exemplary embodiment, a block diagram illustrates an SDN control and management plane 200. On-demand network services represent a direction that network service providers will take to attract new clients and increase their revenues with the network 100. On-demand services can be provided through real-time provisioning of network resources by the SDN control and management plane 200. An on-demand service may refer to a connection between two enterprise client sites (e.g. point-to-point Virtual Private Network (VPN) connection). An on-demand service may refer to a virtual network among multiple client sites (e.g. data centers, many-to-many business connections, etc.).

On-demand services may require immediate, deferred, or periodic bandwidth. Immediate bandwidth may be required for connections that have real-time requirements (i.e. direct business to business connection—banks for example). Deferred bandwidth may be required for connections that know their future demands (i.e. live television events, planned network migration). Deferred bandwidth may also be required for connections that are uncertain but are expected to arrive based on traffic forecasts. Periodic bandwidth may be required for connections that have a periodic bandwidth pattern (i.e. back-up between data centers, daily mobile cellular traffic). The fundamental operation of on-demand networks leads to non-optimal bandwidth utilization (connection releases create idle bandwidth that could be better allocated).

The on-demand business model requires specialized management plane entities, such as in the SDN control and management plane 200, which enable agile network operation including, for example, components to provide real-time path computation and global restoration calculation. The fundamental operation of on-demand networks leads to non-optimal bandwidth utilization. Generally, connection releases create idle bandwidth that could be better allocated, and, by definition, on-demand services will see more connection releases. The network view of these components may be based on snapshots of the network, so allocating resources may result in an inefficient usage of network resources through stranded bandwidth. The bandwidth that can be provisioned to new services will be needlessly limited if a number of stranded network resources is allowed to increase without remedial action. In various exemplary embodiments described herein, a network optimizer is described in the SDN control and management plane 200 to clean-up provisioned network resources to free-up stranded bandwidth.

SDN Control Plane and Management Plane Components

The SDN control and management plane 200 is an ecosystem of logical components, executed on one or more servers or other processing devices, which enable on-demand services in a network with real-time negotiation of Service Level Agreements (SLAs). The various components work to provide on-demand network connectivity and network resource management. The SDN control and management plane 200 can include various modules such as an admission control 202 module, a path computation 204 module, a global restoration calculation 206 module, a network analytics 208 module, a network optimizer 210 module, and a network management 212 module. The SDN control and management plane 200 can also include databases such as a traffic database 214, a topology database 216, and a network status database 218. The various modules 202, 206, 210, 212 are communicatively coupled to the network 100. The network 100 is communicatively coupled to the databases 214, 216, 218. The databases 214, 216, 218 provide information to the path computation 204 module.

Network clients 220 are configured to interact with the SDN control and management plane 200 for service requests. The admission control 202 and the path computation 204 determine if connections should be accepted and their initial placement. Specifically, the admission control 202 negotiates with outside entities on behalf of the SDN controller 150 and/or the SDN control and management plane 200 to determine whether a connection/network should be accepted or not. The path computation 204 determines a least cost path through the network, which satisfies constraints such as Quality of Service (QoS), bandwidth requirements, and meets other network policy criteria.

The global restoration calculation 206 determines where the protection capacity should be reserved for existing connections. The global restoration calculation 206 determines protection paths for provisioned connections requiring protection and may provision components with the knowledge of alternate protection paths.

The network analytics 208 analyzes the current information about the network 100 (i.e. allocated bandwidths, traffic patterns, connection behavior) and produces information to be used elsewhere (i.e. to calculate future link bandwidth usage); produces a demand matrix for static weight calculation; and measures level of congestion in the network and provides PCS (Path Computation System) with information to adjust routing parameters. The network analytics 208 can include mathematical models and machine learning algorithms to detect and extrapolate trends and to formulate policies and triggers that control the network optimizer 210.

The agile network management 212 modifies the topology to deal with impairments, or to better match network load. The agile network management 212 reconfigures network resources across multiple layers to enhance reliability and create network bandwidth where it is needed. The agile network management 212 may change power, direction, or modulation levels of L0 (Layer 0) light-paths; change location of network function virtual components to change virtual topology; and recommend to network provider to physically move or add equipment.

The topology database 214 contains information about link properties (connections between elements, the maximum rate between elements) in the network 100. The topology database 214 may contain information about logical links (links that span multiple hops, available OTN containers) and may contain information about physical links (information about optical spectrum allocation, availability of OTN containers and their type, shared risk link groups, etc.).

The network status database 218 collects the current information about the network 100 (i.e. packet counters, allocated bandwidths, traffic patterns, connection behavior). The traffic database 214 contains information about current and promised bandwidth for A-Z flows, including the promised and current bandwidth on links.

The network optimizer 210 is a logical component that provides re-routing of existing services to eliminate stranded bandwidth and increase network efficiency. As other components in the SDN control and management plane 200 deal with bandwidth requests and network changes causally, they may cause inefficient bandwidth usage. The network optimizer 210 optimizes the use of network resources to better match existing and future network loads. The network optimizer 210 reconfigures existing connections across multiple layers to recover "stranded bandwidth" through bandwidth optimization. The network optimizer 210 interacts with the rest of the components in the SDN control and management plane 200 and is the topic of the remainder of the disclosure.

Synchronization Among Components

The network inputs to various components in the SDN control and management plane 200 may be a snapshot in time of the committed network bandwidth, which may result in race conditions. The network optimizer 210 may assume that a connection move is possible, but a new connection may block it. The admission control 202 assumes that a connection can be accepted based on certain resources being free, but the network optimizer 210 moves an existing connection making these resources unavailable. The network optimizer 210 or the admission control 202 may assume that a connection has sufficient protection capacity, but this capacity may be used up by the other component. The global restoration calculation 206 may assume that a resource is available for protection, but the network optimizer 210 or the admission control 202 uses the resources.

Race conditions may be resolved through coordination among the components in the SDN control and management plane 200. The components may pass a token to indicate which of them is writing bandwidth commitments in the network 100. The components may use a shared lock to indicate if the network is available to write bandwidth commitments.

Race conditions may also be resolved through algorithm design. If network optimizer 210 detects that a connection move is blocked, it rolls back the move and calculates the new move. If admission control 202 detects that a connection provisioning is blocked, it rolls back the provisioning and calculates a new path. The global restoration calculation 206 may continuously run to calculate protection with the changing resource usage.

Bandwidth Optimization

The objective of the bandwidth optimization systems and methods is to reconfigure network resources in a way that enables more end-to-end bandwidth in the network 100. The efficiency of available bandwidth may decrease as the network 100 accepts new connections due to fragmentation of bandwidth resources. Network fragmentation occurs due to "stranded bandwidth", which is bandwidth that cannot be used due to its small size, inaccessibility, or inefficient assignment. Fragmentation may happen as the result of dynamic bandwidth allocation and de-allocation, which causally allocates network resources (connection release leads to non-ideal resource allocations for remaining connections).

Causality means that network resources are allocated with only the knowledge of past and current resource allocation decisions without taking into consideration what future resources may be released or requested. Due to causality, a bandwidth request may be placed in the network 100 using less than its ideal resources because some of its resources are already used by other older bandwidth requests. Anytime a bandwidth request is given a non-ideal resource there is potential to strand bandwidth, which may be better used by another, subsequent, bandwidth request.

Bandwidth fragmentation means different things in different layers because different layers have different network resources. Resources in L1 (Layer 1) are available OTN (Optical Transport Network) containers on a link. Fragmentation may happen if a link is used to route a first A-Z connection, but that link is on the ideal path for a second A-Z connection. When the first A-Z connection is released, the second A-Z connection is consuming more resources than it should, potentially blocking a third A-Z connection. Resources in L2 (Layer 2) are the FIB (Forwarding Information Base) entries and the ingress and egress port capacity. Statistical multiplexing capacity may be given away by overbooking a resource on a link or a switch used to route a first A-Z connection, but that link is on the ideal path for a second A-Z connection. Second A-Z connection may take a less ideal path, taking up resources of a third A-Z connection. Resources in L0 (Layer 0) are wavelength usage per link.

Bandwidth Optimization Process

Figure 3:
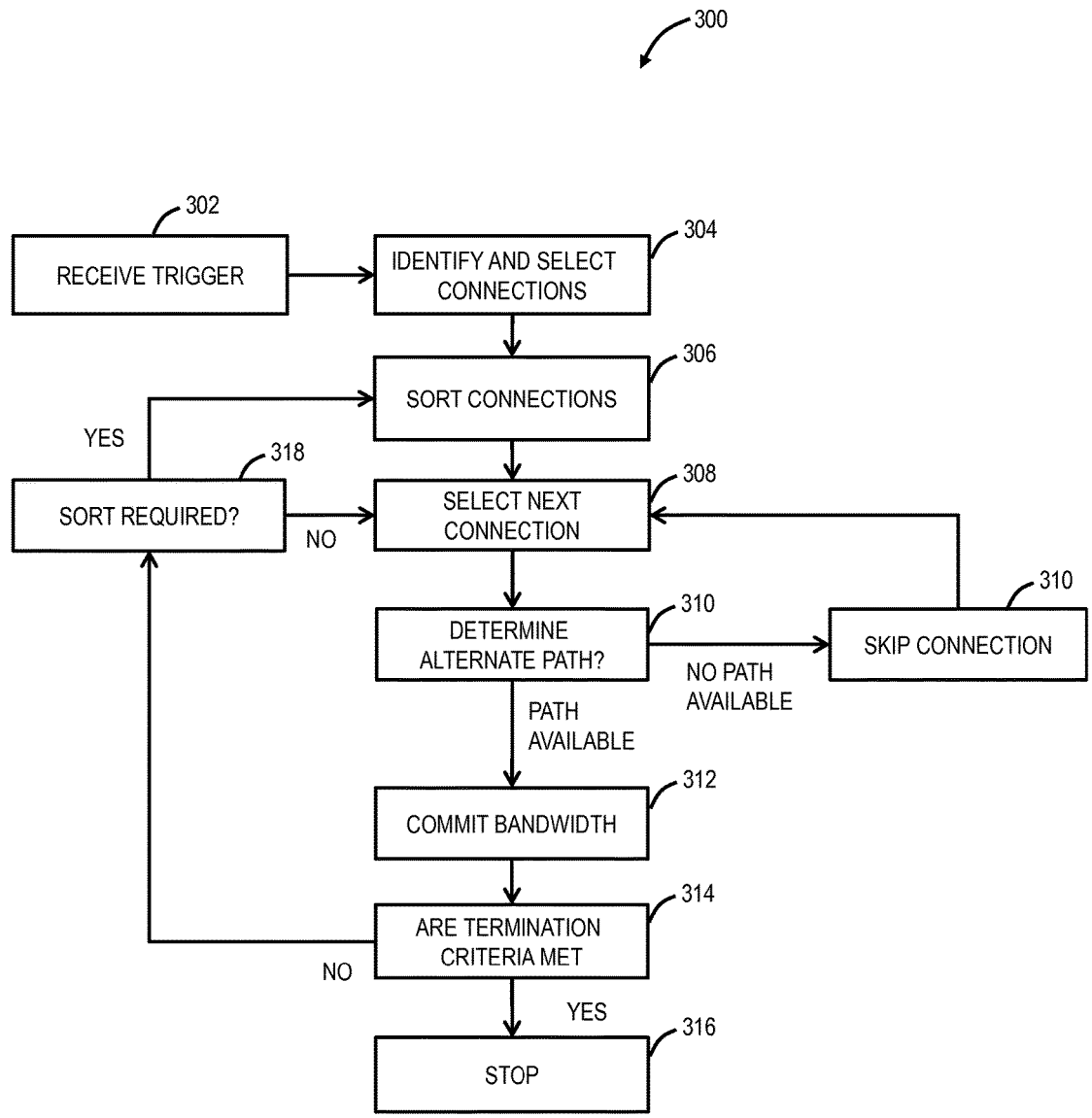
FIG. 3 is a flowchart of a bandwidth optimization process.

Referring to FIG. 3, in an exemplary embodiment, a flow chart illustrates a bandwidth optimization process 300. The bandwidth optimization process 300 can be used for single-layer or multilayer optimization. In single-layer optimization, all connections are in the same layer. For multi-layer optimization, the selected connections may be from different layers, and the bandwidth optimization process 300 may be run sequentially for each layer. The bandwidth optimization process 300 contemplates operation through the bandwidth optimizer 210 in the SDN control and management plane 200 for the network 100. Alternatively, the bandwidth optimization process 300 contemplates operation on a server, a network planning system, a Path Computation Engine (PCE), a network management system, or a combination thereof. While described with reference to SDN, the bandwidth optimization process 300 can be implemented in any networking context, including distributed control planes or the like.

The bandwidth optimization process 300 may be used in a testing or live mode. In the testing mode, the connection moves are determined but not actually made. The output of the testing mode is an ordered list of moves that can be performed later, after operator acceptance. In the live mode, the connection moves are determined and performed as the bandwidth optimization process 300 goes on.

The bandwidth optimization process 300 includes receiving a trigger (step 302) which can be based on network feedback. Since the bandwidth optimization process 300 is used to make more bandwidth available, it can be triggered when more bandwidth is needed. If the bandwidth optimization process 300 is triggered too often, this may result in decreased QoS since each connection move may incur a hit in terms of lost packets. If the bandwidth optimization process 300 is triggered too late, this may result in unnecessary blocking of new connections.

The bandwidth optimization process 300 includes identifying and selecting connections (step 304) and sorting the identified and selected connections (step 306). The sorting of the connections is based on the goal of the optimization. For single layer optimization, the connections may be sorted to maximize the available bandwidth after the optimization. For multi-layer optimization, the connections may be sorted by the priority at which available bandwidth is required in other layers.

The bandwidth optimization process 300 includes traversing the sorted connections by selecting the next connection (step 308) and determining an alternate path for the next connection (step 310). The determined alternate paths may be implemented with multiple routing mechanisms, e.g., ordinary path computation may be used, path computation with modified weights may be used, path computation with fusion of links, or containers may be used, etc. If no path is available, the bandwidth optimization process 300 includes skipping the connection (step 312) and returning to the step 308. If there is an available path after the step 310, the bandwidth optimization process 300 includes committing the bandwidth to the available path (step 312).

After each connection is addressed individually in the bandwidth optimization process 300, the bandwidth optimization process 300 can check if termination criteria are met (step 314), and if so, the bandwidth optimization process 300 ends (step 316). The bandwidth optimization process 300 is terminated when the cost of optimization exceeds its benefits, based on multiple different criteria for the cost. If the termination criteria are not met, the bandwidth optimization process 300 includes determining if the connections need to be sorted again (step 318). Also, a user may be prompted for input at any stage in the bandwidth optimization process 300 and confirmation may be required prior to any move or moves may be fully automated.

Triggering Examples

First, the process 300 may be started by an outside stimulus. Triggers are necessary to start the process 300 and may often be tied to network performance. Typically the trigger should indicate that the network 100 should be defragmented to prevent future connection blocking or that bandwidth can be better utilized. A trigger may result in a delayed optimization, i.e. congestion may be detected during the busy hour, but optimization may only be done during the less busy maintenance period. A trigger may inhibit fragmentation, i.e., if no connection requests have been blocked since the last optimization then the currently scheduled optimization may be skipped or deferred. Triggers may be discounted by age to provide more weight to more recent events (most recent instances of blocking more indicative of current congestion state than old instances).

Exemplary triggers may include manual trigger by network operator; network configuration or capacity changes; introduction of new nodes or links provides potential for improving network efficiency; scheduled trigger (periodicity is set by the operator e.g. monthly, weekly, daily, hourly); congestion state triggers, existing connection releases making re-deployable capacity available, connection attempt(s) blocked from entering the network; "Test" connection failures (synthetic connection attempts that probe congestion state but are not set up); connection is accepted in the network but there was not sufficient capacity to protect it; link, group of links, or entire network exceeding utilization by some threshold; end-to-end utilization on A-Z or group of A-Zs exceeding utilization by some threshold (end-to-end utilization defined, for example, as max-flow bandwidth in empty network, divided by max-flow bandwidth in network with current allocations); probability of exceeding link or end-to-end utilization by some threshold based on a forecast of traffic (congestion may be defined differently in different layers e.g., L2 congestion may be packet loss, L1 congestion may be OTN container fill, L0 congestion may be wavelength blocking in Reconfiguration Optical Add/Drop Multiplexers (ROADMs).

Selection of Connections

Connections are first collected based on some criteria and then filtered to remove the unwanted connections. It is advantageous to collect and filter out connections that participate in fragmenting to achieve some goal, such as decrease the amount of network churn, conform to a policy, maintain QoS expectations, achieve multi-layer network goals such as connection bundling or expressing. Also, not all connections collected in the first step can be moved, e.g., due to customer agreements, protection, or layering.

The selection of connections may be done in two steps such as collecting all connections that fit some criteria and filtering connections that do not fit some more specific criteria. Other methods may also be used (e.g. using relational database queries; combining selection, sorting and cut-off).

Example criteria for collecting of connections can include, without limitation all connections with the same customer profile or in a group of customer profiles; all connections with the same QoS or SLA definition; all connections with the same source-destination network elements, such as point-to-point, point-to-multipoint, multipoint-to-multipoint; all connections sharing the same sub-network such as network-wide, sub-network, path, link as well as virtual network-wide mapped on actual topology; all connections with the same time range such as by start time, end time, periodicity, connections in progress versus connections scheduled but not yet active; and the like.

Example criteria for filtering of connections can include, without limitation, remove connections based on user constraints (e.g., a permanent SNC) or connection status (e.g. connection in the middle of a protection switch); keep or remove connections with the same customer profile or in a group of customer profiles; keep or remove connections with the same source-destination network elements such as point-to-point, point-to-multipoint, multipoint-to-multipoint; keep or remove connections sharing the same sub-network such as network-wide, sub-network, path, link as well as virtual network-wide mapped on actual topology; keep or remove connections in a given time range of the request such as by start time, end time, periodicity, connections in progress versus connections scheduled but not yet active; remove connections, which are scheduled for release in the next T seconds or before; and the like.

The collection or filtering steps may involve several iterations with different criteria in each iteration. For example, collect based on collect-criteria 1, 2 and, 3, then filter based on filter-criteria 1, 2, and 3; collect based on collect-criteria 1, then filter based on filter-criteria 1, then collect based on collect-criteria 2, then filter based on filter-criteria 2, then collect based on collect-criteria 3, then filter based on filter-criteria 3; collect based on collect-criteria 1 and 2, then filter based on filter-criteria 3, then collect based on collect-criteria 3, then filter based on filter-criteria 2 and 3; and the like.

Sorting of Connections

The goal of sorting the connections is to achieve the most bandwidth savings after optimization when it is desirable to limit the number of connection moves. The bandwidth optimization process 300 is greedy, by which is meant that in each step (typically consisting of single connection being assessed for re-establishment) it tries to recover the most stranded bandwidth. If connections are sorted so that the connections causing the most stranded bandwidth are moved first, then the optimization may remove most stranded bandwidth early in the execution of the bandwidth optimization process 300.

A variety of sorting alternatives is possible. There may be no particular order, or connections are examined first come, or first served order (in order of arrival: essentially random) Several sorting techniques based on usage criteria are possible such as connections have a higher priority than other connections if they use more instantaneous bandwidth; connections have a higher priority than other connections if they use more instantaneous bandwidth summed over their hops (number of hops time instantaneous bandwidth); connections have a higher priority than other connections if they are expected to transmit more bandwidth over their lifetime; connections have a higher priority than other connections if they are expected to use more bandwidth over their lifetime (total bandwidth usage overall hops used by the connection); and the like.

Absolute or relative connection length criteria may be used. Connections can be sorted in the rank of the amount of absolute resources each uses (e.g., bandwidth* hops*duration) (hops are equivalent to links). Connections can be compared to their (minimum) resource requirements in an otherwise empty network, and are then sorted in the rank of how much each exceeds its minimum ("worst offender" first). Here, the minimum resource requirement is how the connection would be routed in an empty network, and this is compared to how it is actually routed. The comparison can be hop count, and it can include the bandwidth and number of hops or the like. Also, sorting criteria can be provided as an input to the bandwidth optimization process 300. For example, a network operator may know of an upcoming service upgrade and set a priority higher for connections that need to be moved to perform the upgrade.

Finding the Alternative Path

Each connection that is a candidate for being moved by the bandwidth optimization process 300 needs to be tested to see if a move provides a benefit. Each potential move requires a (better) path alternative to the current one to be found. If the move provides no benefit (benefit=less fragmentation in the network 100), the move is ignored. One way to find an alternative path is to use a constrained shortest path algorithm to find a path for a connection. The weights used may be hop count, administrative weights, latency, or some other (typically additive) quantity that has been chosen to guide path computation. The weights may also be determined by an optimization algorithm input and set per connection.

Several improvements may be made to the constrained shortest path algorithm for the bandwidth optimization process 300. Available capacity on a link may be used to determine if a connection can be routed on the link. Utilization of a link may be used to determine if a connection can be routed on the link: the link is not used if the new utilization is higher than a threshold (this utilization may have a future component, which is taken into consideration). Link capacity may be protected by a (per link) bandwidth reservation level that restricts the use of that link to "shorter" (more resource efficient) paths when the utilization of the link is beyond the reservation level. Path computation may spread the load across paths of "equal length" (equal resource usage or cost) before considering longer paths as an alternative.

Figure 5:
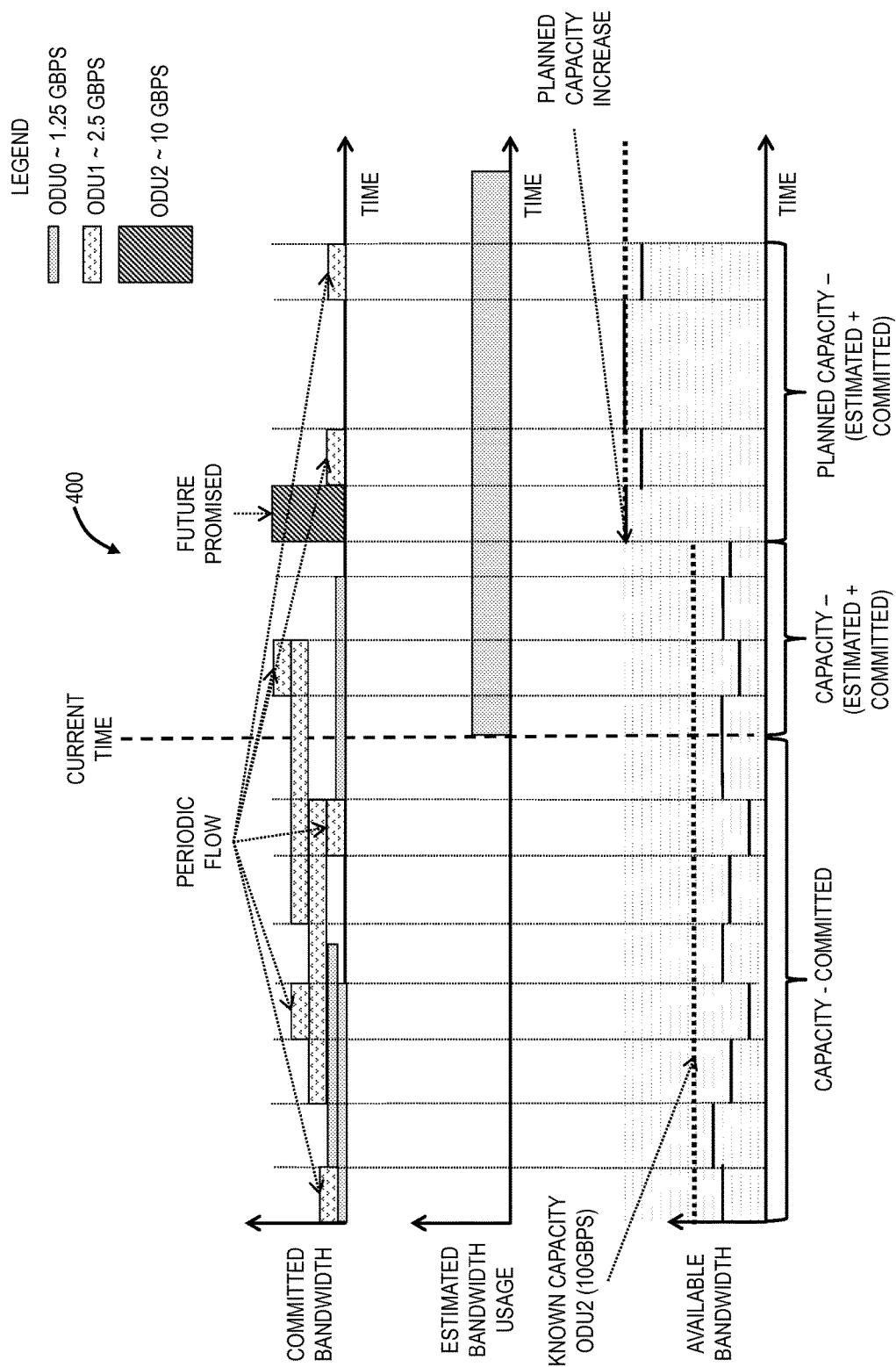
FIG. 5 is a graph of exemplary link bandwidth over time for illustration of the available bandwidth link weight adjustment for a link.

On-demand networks that support immediate, scheduled, and expected but uncertain demands have complex states that evolve over time (an example is illustrated in FIG. 5). The available bandwidth is a function of time: an optimal allocation of resources at one instant may not be optimal at other times and will change as the state of the network 100 evolves. The available bandwidth may be known from currently committed bandwidth and current capacity in the network 100. The available bandwidth may be a weighted sum of currently committed bandwidth in the network 100 and an estimate of future bandwidth requests and current capacity in the network 100. The available bandwidth may be a weighted sum of currently committed bandwidth in the network 100 and an estimate of future bandwidth requests and current capacity in the network 100 and known or estimated future capacity in the network 100. The available bandwidth may be a weighted sum of a future committed bandwidth and an estimate of future bandwidth or known future allocation. The available bandwidth may be known from current bandwidth allocation in the network 100 and the part of bandwidth reserved for important connections. The available bandwidth may be known from current bandwidth allocation in the network 100 and the part of bandwidth reserved for congestion control during the times of congestion.

Periodic optimization of bandwidth achieved by moving existing or scheduled bandwidth allocations has the potential to better track an optimal allocation of resources that is otherwise prone to degradation to a non-optimal allocation due to dynamic connection arrival and release.

Bandwidth Analytics and Optimization Process

Figure 4:
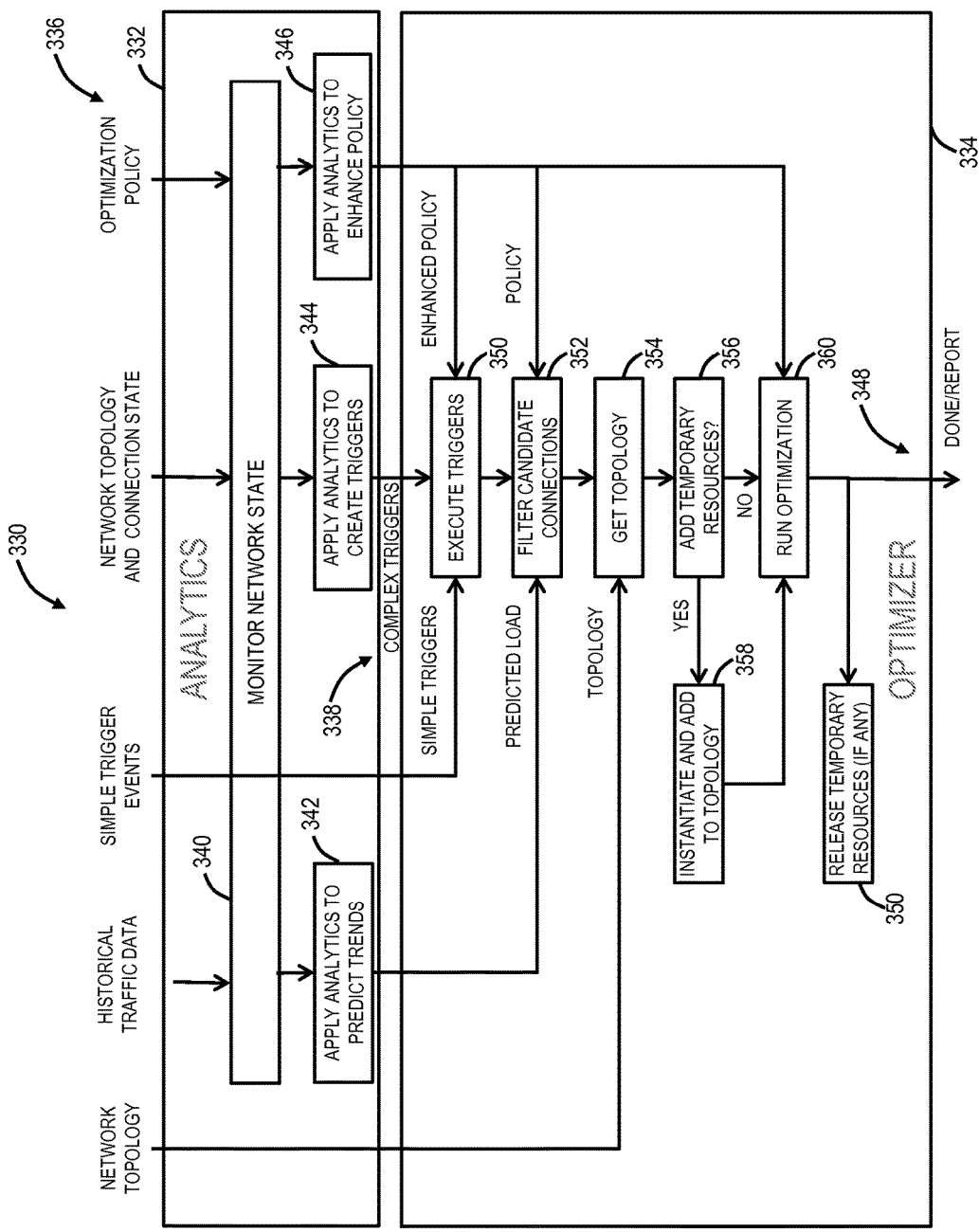
FIG. 4 is a flowchart of a bandwidth analytics and optimization process.

Referring to FIG. 4, in an exemplary embodiment, a flowchart illustrates a bandwidth analytics and optimization process 330. The process 330 describes the interaction between the network analytics 208 and the network optimizer 210. The process 330 can be segmented into a network analytics component 332 and a network optimizer component 334. The network analytics component 332 can be implemented by the network analytics 208 to monitor the network state, make load and related predictions, make cost-benefit tradeoffs related to resource usage, formulate optimization triggers, and enhance the optimization policy using statistical models or machine learning. The network optimizer component 334 can be implemented by the network optimizer 210 to execute network resource optimization algorithms under the control of optimization triggers and the optimization policy.

The network analytics component 332 has various inputs 336 including network topology, connection state, historical traffic data, and an optimization policy. The network topology includes network adjacencies, link resources and their utilizations in the network. The connection state includes a set of end-to-end connections, their start and stop times, resource requirements, and supplemental information (for example, is the connection movable, etc.). The following connection types can be included: Active—a connection that has already been set up and is capable of carrying traffic; and Scheduled—a connection with designated resources that will be set up at some designated time in the future. The historical traffic data can include connection request and disconnect arrival data in raw or modeled form (for example, as A-Z traffic intensities and growth rates, etc.).

The optimization policy can be a set of rules initially supplied by the network operator in order to guide triggering of optimization, filtering or selecting candidate connections, and termination of the optimization. The triggering of optimization can be, for example, a supplied periodic schedule or optimization after each connection release or another event. The filtering or selecting candidate connections includes or provides a set of potentially movable candidate connections. The following move types can be included: Not movable—cannot be moved by the network optimizer 210; Movable in space—can be moved to a different path connecting the same endpoints; Movable in time—can be moved to a different start time; and Movable in space and time—can be moved to a different path and start time. The termination of the optimization determines how the network optimizer 210 ends such as, for example, by limiting the number of candidates or optimization passes, or the amount of resources recovered through optimization.

The network analytics component 332 has outputs 338 including a predicted load, an enhanced optimization policy, complex triggers, and simple triggers. The predicted load can be traffic load predictions that can affect the quality of upcoming optimizations. For example, predicted A-Z pairs that are expected to receive abnormally high or low loads together with associated timeframes and intensities, etc. The enhanced optimization policy can include modifications to the input optimization policy, for example suppressing a scheduled optimization run based on an analysis of network congestion, etc. The complex triggers can be formulated through the network analytics 208 operating on the connection state and historical traffic data that may trigger optimization as determined by the optimization policy (or enhanced optimization policy) such as, for example, weighed blocking metrics crossing thresholds may trigger an optimization cycle.

The network analytics component 332 takes the input and monitors network state (step 340). The monitoring of network state can include passive monitoring and/or active monitoring. The network state may be observed by passive monitors that track events such as instances of connection request blocking and exceedances of pre-set thresholds associated with, for example, capacity utilization levels. Passive monitoring may involve the computation of derived metrics such as blocking rates computed over a sliding window or the use of complex machine learning techniques. The network state may be probed by active monitors that generate synthetic events that are submitted to domain controllers whose response is then observed. An example of synthetic events is test calls that are submitted to path computation algorithms and resource managers in order to test the network's ability to establish particular connections. These test calls are synthetic in that no actual resources are allocated.

From the monitor network state (step 340), the network analytics component 332 applies analytics to predict trends (step 342), applies analytics to create triggers (step 344), and applies analytics to enhance policy (step 346). To apply analytics to predict trends, historical traffic data may be used to predict where traffic is expected in the future. The prediction can be made using, for example, statistical models such as Kalman filters, diffusions, or machine learning algorithms. Traffic predictions can guide the resource optimization algorithms to relocate connections: for example, links where heavy future traffic is expected may be excluded from consideration as move destinations.

To apply analytics to create triggers, complex triggers may be generated by the network analytics 208 in response to changes in the network topology or capacity (for example, adding express links or increasing link bandwidth). Complex triggers may arise from an analysis of the results of network monitoring, for example, the analysis of point-to-point test calls may result in the generation of an optimization trigger. To apply analytics to enhance policy, the network analytics 208 may modify the admissibility of the connection type such as active, scheduled but not yet active, or predicted. The network analytics 208 may select or restrict the move type such as spatial (move to a new path), temporal (move to a new start time). The network analytics 208 may select the metric used to sort candidate connections for optimization. Statistical models or machine learning may be used together with observations of the network connection state to alter, for example, optimization termination criteria by changing the number of optimization passes based on observed blocking rates. Analytics may be used to alter the operation of triggers, for example, scheduled optimization may be inhibited if a suitable discounted blocking metric falls below a target threshold.

The network optimizer component 334 receives the outputs 338 from the network analytics component 332. Thus, inputs to the network optimizer component 334 include simple triggers, complex triggers, network topology, connection state, predicted load, and enhanced optimization policy. The simple triggers may trigger optimization as determined by the optimization policy (or enhanced optimization policy). The simple triggers can include, for example, connection requests, connection terminations, blocking (rejection of a request by the admission control 202), periodic schedule, and the like.

Again, the complex triggers are formulated through the use of the network analytics 208 operating on the connection state and historical traffic data and may trigger optimization as determined by the optimization policy (or enhanced optimization policy. For example, weighed blocking metrics crossing thresholds may trigger an optimization cycle. Again, the topology is the network adjacencies, link resources, and their utilizations. The connection state for a set of end-to-end connections can include their start and stop times, capacity and other resource requirements, service class descriptors or other supplemental information such as the connection type. The predicted load can include traffic load predictions that can affect the quality of upcoming optimizations. For example, predicted A-Z pairs that are expected to receive abnormally high or low loads together with associated timeframes and intensities. The enhanced optimization policy can include modifications to the input optimization policy, for example suppressing a scheduled optimization run based on an analysis of network congestion. Outputs 348 of the network optimizer component 334 include an optimized connection state and/or a report itemizing candidate connections that should be moved together with the recommended move order (for subsequent processing by the network operator).

The network optimizer component 334 executes triggers (step 350). The network optimizer 210 receives triggers and together with the optimization policy decides whether optimization is to be triggered or suppressed. If triggered, the network optimizer component 334 filters candidate connections, based on the predicted load and policy (step 352). The network connection state is filtered under the guidance of the optimization policy to produce a set of candidate connections that will be considered for relocation. Examples of classes of connections can be used as the basis for filtering include active, scheduled, or predicted connections; connections that are tagged as regroomable; connections within a single or specified set of domains/layers. The network optimizer component 334 gets the topology (step 354), to fetch the current network adjacencies, link resources, and their utilizations. The network optimizer component 334 determines if temporary resources are needed (step 356).

Here, the network optimizer component 334 can add temporary resources/instantiate and add to the topology/release temporary resources (step 358). If the optimization policy permits, temporary resources may be adjoined to the network for purposes of optimization: the optimization algorithms are free to use these resources as a temporary "parking lot" providing the final placement of a connection does not use any of the temporary resources. Temporary capacity can be provided using optical margin mining techniques such as described in U.S. patent application Ser. No. 14/176,908, filed on Feb. 10, 2014, and entitled "SYSTEMS AND METHODS FOR MANAGING EXCESS OPTICAL CAPACITY AND MARGIN IN OPTICAL NETWORKS," and U.S. patent application Ser. No. 13/372,013, filed on Feb. 13, 2012, and entitled "HIGH SPEED OPTICAL COMMUNICATION SYSTEMS AND METHODS WITH FLEXIBLE BANDWIDTH ADAPTATION," the contents of each is incorporated in full by reference herein. When the optimization is completed, the temporary capacity could be released. Temporary capacity can increase the number of connections that can be moved by removing resource limitations that may impede moves: for optimization algorithms where each effected move increases network efficiency the net result of additional moves is greater efficiency than would otherwise be possible.

Figure 6:
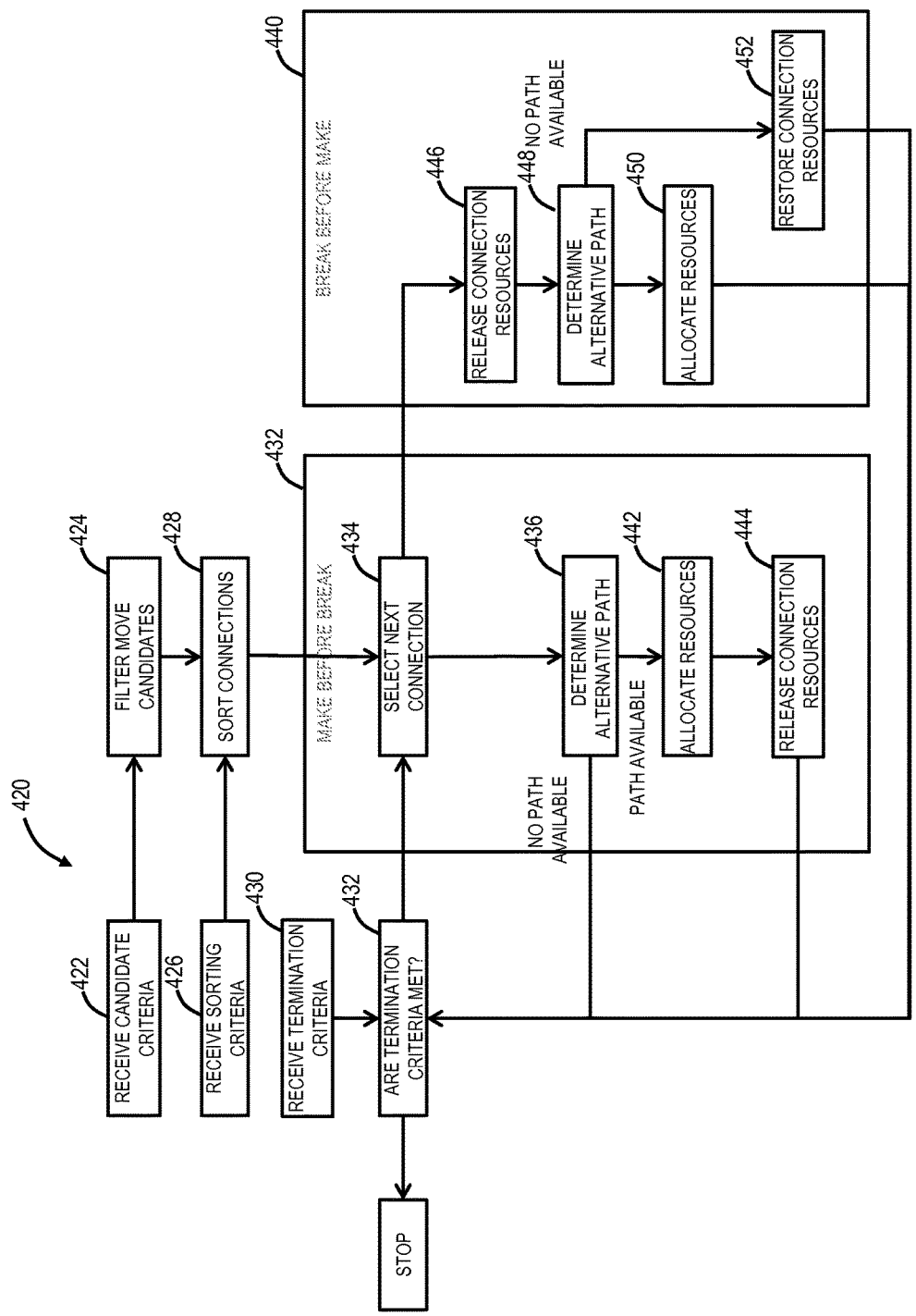
FIG. 6 is a flowchart of a resource optimization process.

Next, the network optimizer component 334 can run an optimization (step 360). The network resource optimization runs under the constraints imposed by the optimization policy and, in particular, terminates in conformance to criteria supplied by the optimization policy. The optimization policy determines how long it should run before termination (for example, how many connections may be moved, how many optimization passes are used, or how much reclaimed capacity is sought). Candidate connections may be sorted into a move order designed to maximize the impact of early moves and to minimize the amount of effort required to perform the moves or to meet a target level of reclaimed resources. A number of exemplary techniques are described herein, such as in FIGS. 6-7. Typical implementations rely on the availability of an efficient path computation algorithm.

Examples of Available Bandwidth Tracking on a Link

Referring to FIG. 5, in an exemplary embodiment, a graph illustrates exemplary link bandwidth 310 over time for illustration of the available bandwidth link weight adjustment for a link. The graph includes three graphs—committed bandwidth, estimated bandwidth usage, and available bandwidth, and is shown with a current time with times before the current time having occurred and times after the current time as future expectations. The committed bandwidth shows bandwidth provisioned currently and in the past as well as future provisioned bandwidth. From the committed bandwidth, in the past, the estimated bandwidth usage can be derived for the future, such as based on analysis of previous behaviors. The available bandwidth link weight adjustment can provide adjustments to the link weight based on the available bandwidth graph which can take into account the estimated bandwidth usage plus any future promised bandwidth for the committed bandwidth.

Committing Resources

Each connection that is a candidate for being moved by the processes 300, 330 needs to be tested to see if a move provides a benefit. Each potential move requires a path alternative better than the current one to be found. The alternative path computation interacts with resource management in the network 100: these two mechanisms determine how resources are committed to the moved connection.

The following alternatives are possible—disjoint path and path segment re-use. For the disjoint path, the candidate connection (old path) is left in place, and the path computation algorithm attempts to find a more efficient path disjoint from the old path. If a better path is found, a connection is established using the associated resources. The data stream is moved to the new path, and the resources associated with the old path are released. If a more efficient alternative cannot be found, no action is taken.

For path segment re-use, the candidate connection (old path) is released freeing all associated resources. The path computation algorithm attempts to find a more efficient path, potentially using some or all of the released resources, allowing one or more segments of the old path to be re-used. If a better path is found, a connection is established using the associated resources and the data stream is moved to the new path. If a more efficient alternative cannot be found, the old path is restored. Alternatively, the first step above is performed offline (using a network state that reflects the resources of the old path being free): if a better path can be found then the resources supporting the old path are released, and steps 2 and 3 are carried out. Otherwise, no action is required.

Termination Criteria

The processes 300, 330 can allow the number of connections moved to be selected to achieve the maximum desired impact while limiting the work required and disruption to customer data flows. For a full run, all connections in the candidate list are moved, stopping only if no connection remaining in the list can be moved. For early termination, terminating after K connections have been moved: K is predetermined or determined dynamically as described below. Terminate after total bandwidth of connections moved or reclaimed exceeds a bound. For multiple-runs, terminate each run after K connections have been moved where K could correspond to the complete list, resort after K connections have been moved, and terminate algorithm after the list is resorted N times.

The termination criteria could be based on fragmentation level—move connections until total reclaimed bandwidth is above a threshold or move connections until total available bandwidth is above a threshold. The bandwidth optimization process 300 is defined in a way that the connection list can at worst shrink during the running of the algorithm. If new connections should be added at any point in the processes 300, 330, processes 300, 330 can be re-run with different selection criteria. If a connection is moved, it may be a candidate for a move in a subsequent pass as new resources are now available. An option is to remove it from the list after a move to prevent the same connection from being moved multiple times.

Outputs

The processes 300, 330 can be run in a "test", or an off-line mode (no connections are actually moved) but move recommendations are produced or in a live mode. In the test mode, the processes 300, 330 produce an ordered list of connections, which may be used to move connections one-by-one. Extra information may be provided in the sorted list such as a CDF (Cumulative Distribution Function) of how much bandwidth is saved by moving connections up to that point in the list. In the live mode, the processes 300, 330 produce control plane or SDN commands required to move connections Resource Optimization Process Referring to FIG. 6, in an exemplary embodiment, a flowchart illustrates a resource optimization process 420. The optimization process 420 is an exemplary embodiment of step 350. The optimization process 420 receives candidate criteria (step 422) that define the filtered set of connections that can be moved (step 424). The move candidates may be all connections (active, scheduled but not yet active, or both) or they may be subsets determined by the analysis, decision, or optimization algorithms or by exogenous inputs (for example, specific connections may be tagged as immovable at customer request or by their service class). If the optimization is triggered by a new connection request, a connection release, or connection request blocked then the move candidates may be limited to those that are directly affected (for example, connections that have the same source and destination as the triggering connection).

The optimization process 420 receives sorting criteria (step 426) from the (enhanced) optimization policy which it follows to sort connections (step 428) into a move order that is expected to produce a desired tradeoff between improvement in network state and optimization effort or cost. Typical sorting orders are determined by the following metrics (move connection A before B if metric(A)>metric(B)) such as connection bandwidth*Length, connection bandwidth*Remaining duration*Length, connection bandwidth*Remaining duration*Excess length, etc. where Length=Hops, Excess length=Hops–Hops in the ideal path (the ideal path is the shortest possible connection between the same source and destination in an otherwise empty network).

The optimization process 420 receives termination criteria (step 430) from the (enhanced) optimization policy that determine how many connections can be moved before the optimization process 420 stops (step 432). The optimization process 420 may operate in multiple passes through the ordered list of candidates: there may be limits to how many connections are moved per pass and how many passes are employed. Alternatively, metrics which measure some other aspect of optimization work than connection move counts or which measure some attribute of the connection state (for example, how much bandwidth has been recovered) may be used for termination.

Figure 7:
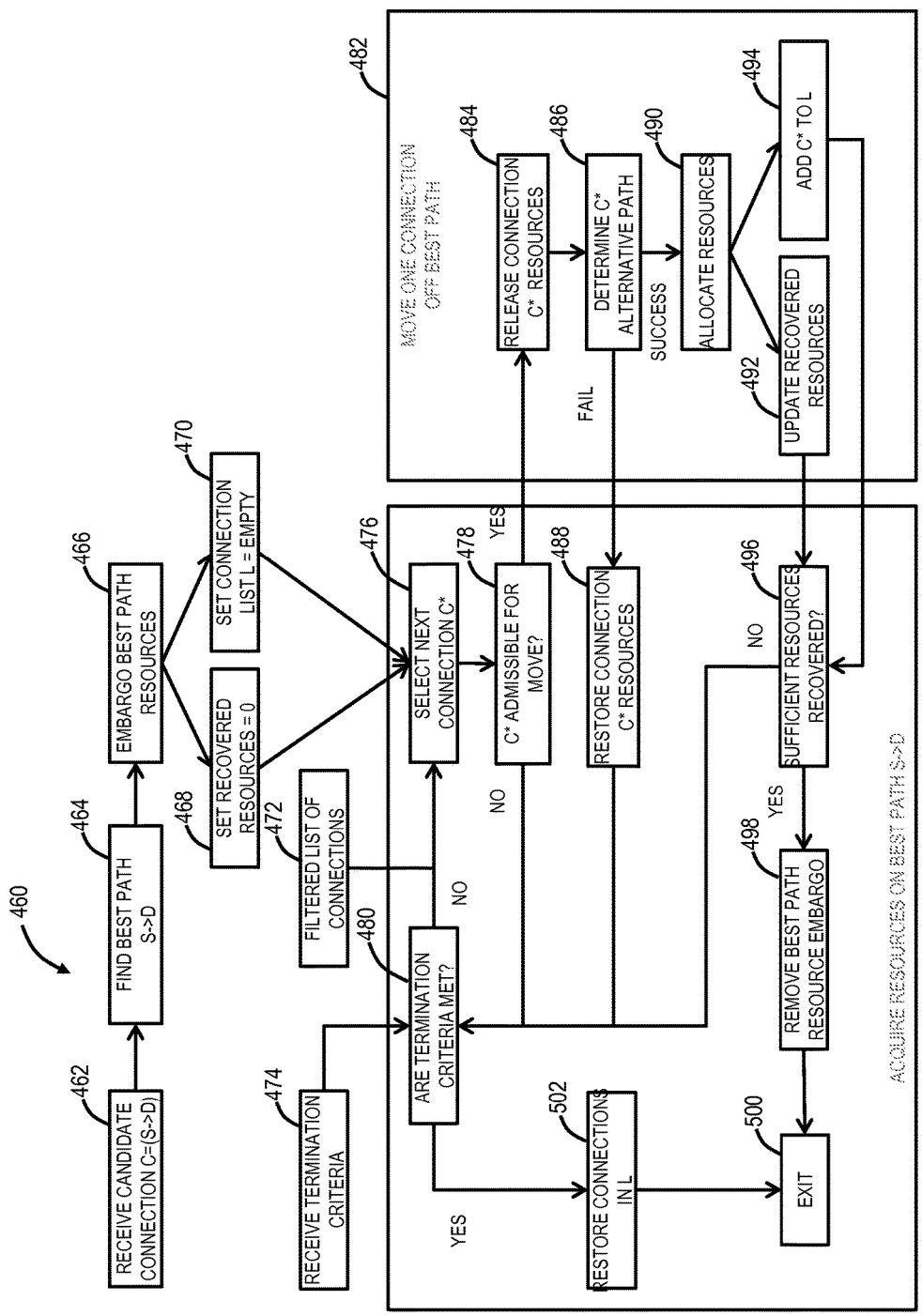
FIG. 7 is a flowchart of a "Clear Path" optimization process.

The basic schema for the optimization process 420 is the loop get next candidate A→move A to a better path→repeat till termination criteria met The connections are selected (step 434) one-by-one in order from the sorted candidate list. Next the optimization process 420 tries to move the connection to a better path: here "better" usually means fewer hops since the bandwidth and duration are generally unchanged. This also applies to the case of elastic connections where the product "Connection bandwidth*Remaining duration" is constant. For each candidate connection, the optimization process 420 may find a (better) alternative path (step 436) in a number of different ways. A path computation algorithm may be invoked using the current network state to try to find a better path for the candidate connection. The result may be a move in space and time or both. The best possible path for the candidate connection is the best path (between the same source and destination as the candidate) in an otherwise empty network. The optimization process 420 can then try to clear enough connections from this best path so that the candidate will fit. If successful, this becomes the alternative target path for the candidate. Exemplary details are shown in FIG. 7 and a "Clear Path" optimization process. What follows (the Clear Path algorithm) is an alternative to the simple use of a path computation algorithm to try to move a candidate connection to a better path. The clear path algorithm is an alternative to steps 436, 442, 448, 450.

Two modes can be included for managing connection moves, namely Make-Before-Break (MBB) 438 and Break-Before-Make (BBM) 440. In MBB 438, the optimization process 420 tries to find a better path: if one is found resources are allocated (step 442) to establish the connection before the algorithm releases the original connection's resources (step 444). This reduces the disruption to the customer to the required switchover time but is unable to reuse any of the resources associated with the original connection. In BBM 440, the optimization process 420 first releases the original connection's resources (step 446) before it tries to find a better path (steps 448, 450): if one is not found the original connection is reestablished (step 452). The disruption to the customer is larger, but parts of the original connection can now be reused. Various hybrid combinations of these modes are also possible (particularly if connections span multiple domains).

Clear Path Optimization Process

Referring to FIG. 7, in an exemplary embodiment, a flowchart illustrates a "Clear Path" optimization process 460. The optimization process 460 receives a candidate connection (step 462) C=(S→D) from source S to destination D. The optimization process 460 then finds the best path S→D (step 464) in an otherwise empty network using suitable path computation algorithms or retrieves the path if is computed in advance. The optimization process 460 embargoes the resources of the best path (step 466), marking them so that subsequent path computations do not use them. The optimization process 460 initializes recovered resources variables (step 468) to keep track of resources on the best path S→D that will be recovered from its operation. The optimization process 460 also creates a list L (initially empty) (step 470) that will keep track of connections it has moved off the best path S→D. The optimization process 460 receives a list of candidate connections (step 472) that are considered for moving: this list is filtered and sorted in a manner similar to that appearing in the optimization process 420. The optimization process 460 receives termination criteria (step 474) that determine how many connections are moved before the optimization process 460 stops in a manner similar to the optimization process 420.

The optimization process 460 selects the next connection C* from the filtered list of candidates (step 476). The optimization process 460 checks if C* is admissible for a move (step 478). For C* to be admissible it must not be identically the connection C (it can, however, share any or all the same characteristics such as path, bandwidth, duration), not already be on its best path, have at least one link in common with the best path S→D, and have a temporal existence as described by the interval [Start_time*, End_Time*] that has a non-empty intersection with that of the original connection [Start_time, End_Time].

If C* is not admissible for a move (step 478), then the optimization process 460 skips this connection, checks if the termination criteria are met (step 480) to see if it should stop and if not selects the next connection (step 476). If C* is admissible (step 478), then the optimization process 460 attempts to move it from the best path S→D (step 482) by executing the following steps (alternatively, the optimization process 460 can be called recursively). The resources for connection C* are released (step 484). The process described here uses the "break before make" approach (described earlier) for simplicity. However, the "make before break" approach could be used here as well. Path computation algorithms are invoked to find an alternative path for C* (step 486). If an alternative path is not found (step 486) then the resources for connection C* are restored (step 488) and the termination criteria are checked (step 480).

If an alternative path is found (step 486) it does not intersect the best path S→D because of the embargo applied to this path upon initialization and the following are executed. Resources are allocated to establish the new path for C* (step 490). The resources released from the best path S→D are added to the cumulative resources recovered (step 492). The connection C* is added to the list L of connections displaced from the best path S→D (step 494).

The resources recovered so far on the best path S→D are compared to what is needed to permit moving connection C to this path. A move is beneficial if New cost<Original Cost where (cost is the total resource cost of a connection, typically Cost=Connection bandwidth*Remaining duration*Length). The Original cost=Cost of original connection C+Cost of all original connections C* in L, and the New cost=Cost of new connection C+Cost of all moved connections C* in L. If sufficient resources are recovered (step 496), the embargo on the best path S→D is lifted (step 498) and the optimization process 460 exits (step 500). If insufficient resources are recovered (step 496), the termination criteria are checked (step 480). If the termination criteria are met (step 480), then the original connections C* in the list L are restored (step 502) and the optimization process 460 exits (step 500).

Spatial and Temporal Moves

The bandwidth optimization systems and methods allow scheduled but not yet active connections to be moved in space transparently to customers. Additionally, a new class of traffic can be defined permitting scheduled connections to be shifted in time as well as in space. Scheduled connections are a new feature of transport networks and optimization across both spatial and temporal domains has previously not been considered.

Analytics

If traffic is predicted between particular source-sink (A-Z) pairs in the network, the optimal predicted routes can be embargoed or constrained to prevent the optimization processes from using them. Predictive modeling can be used to trigger optimally or suppress resource optimization in order to achieve an improved balance between network efficiency and expended (optimization) work. The bandwidth optimization process applies analytics to filtering move candidates, performing cost/benefit tradeoffs and related complexity analysis, formulating optimization algorithm termination criteria, and formulating optimization triggers. These are novel applications to transport networks; in particular, the historical data to support this functionality has not been available.

New Optimization Algorithms

The various optimization processes described herein can be applied to spatial or temporal optimizations or both. Candidate connections can be sorted by the quantity of various resources used; each candidate can be examined in order and an alternate path determined using a path computation algorithm operating on the current network state. A move to the alternate path is enabled if the total (post-move) resources are decreased. Multiple passes over the candidate set may be used and the number of connections moved per pass can be limited. Pass and move limits can be fixed or determined by analytics (for example, once a resources-recovered target is met).

Alternatively, the following novel "path clearing" process can be used: each candidate connection is moved to its ideal path by first clearing enough resources from this path to permit the move: all of the moves would be effected if the total resources used would be decreased. Otherwise the connections "pushed aside" would be restored. This process can be made fully recursive to arbitrary depth or as limited by analytics. Moves can be effected in real time on the working network or in an offline planning mode to permit subsequent follow-up. Note, techniques that jointly implement spatial and temporal optimizations are new in transport networks.

Temporary Capacity

Temporary resources (as identified by network analytics) can be provided to supplement network resources providing additional (temporary) routes that optimization algorithms can take advantage of in the process of their operation after which the capacity would be released. The use of this temporary capacity as a "parking lot" can improve the outcome of optimization by enabling moves that would not otherwise be possible due to lack of resources. Temporary capacity could be provided (for example) by using emerging coherent optical systems with flexible modems, such as Liquid Spectrum from Ciena. Network optimization using temporary capacity has never been used in transport networks.

Optimization Trigger Mechanisms

Optimization could be performed according to a periodic schedule (determined by network analytics) or could be performed after events such as a connection request, connection release, or blocked connection request. Optimization could be triggered by changes in network capacity such as the increase of bandwidth of individual point-to-point links or by the introduction of express links between nodes originally connected through multi-hop paths. Optimization could be performed as determined by passive monitoring, for example, metrics (such as instantaneous blocking) exceeding thresholds; by active monitoring of network analytics (such as the results from synthetic test calls); by predictive analytics that indicate, for example, that congestion is expected in certain parts of the network; by the use of statistical analysis of predictive analytics to determine when to trigger optimization; deferred if network analytics determines there would be insufficient benefit from optimization at that time; and the like.

Optimization Across Multiple Domains and Multiple Layers

End-to-end connections could traverse multiple network domains with multiple layers, each managed by the same or different operating companies. The bandwidth optimization systems and methods can be applied to each domain/layer individually without the use of any additional mechanism. The bandwidth optimization systems and methods can be applied in conjunction with a multi-domain/multi-layer controller or orchestrator without the use of any additional mechanisms if multi-domain/multi-layer path computation is available. A hierarchical form of the bandwidth optimization systems and methods can be applied in conjunction with a multi-domain/multi-layer controller or orchestrator without multi-domain/multi-layer path computation being available.

Bandwidth Optimization Systems and Methods

The bandwidth optimization systems and methods in connection-oriented networks reclaims connection resources that are used inefficiently by using analytics to identify candidate connections to move; using analytics to predict connection arrivals and using these predictions to guide the optimization process (the best connecting routes can be embargoed or constrained to prevent the optimization algorithms from using them); moving connections in space (to new paths) or time (to start and stop at different times) or both; moving active connections, scheduled connections, or both; using new optimization algorithms where each move candidate is examined individually and moved if the total resources required would be decreased; using new optimization techniques where each connection is moved to its ideal path by first clearing enough resources from this path to permit the move and if the total resources used would be decreased; ordering moves by the quantity of various resources used; terminating further moves once a target level of benefit is realized; moving connections in real time on the working network or in an offline planning mode to permit subsequent follow-up; using temporary capacity (as identified by network analytics) to supplement network resources with a "parking lot" permitting moves that would otherwise be blocked due to resource shortages; and using analytics to trigger or suppress optimization in order to achieve an improved balance between network efficiency and expanded (optimization) work.

Triggering optimization can be triggers: periodically, using a schedule (determined by network analytics); passively: upon changes in network capacity such as the increase of bandwidth of individual point-to-point links or by the introduction of express links between nodes originally connected through multi-hop paths; passively: after each connection request, after each connection release, or after designated metrics (such as the instantaneous blocking probability) exceed thresholds; actively: as determined by network analytics (such as the results from synthetic test calls); predictively: as directed by prediction of expected demand or congestion in parts of the network; and/or predictively: as directed by statistical analysis and prediction based on analytics. Also, the optimization triggering can be suppressed if network analytics determines there would be insufficient benefit from optimization at that time.

To optimize connections that traverse multiple network domains or multiple layers, the optimization can be applied to each domain/layer individually without the use of any additional mechanisms; applied in conjunction with a multi-domain/multi-layer controller or orchestrator without the use of any additional mechanisms if multi-domain/multi-layer path computation is available; and/or applied in a hierarchical form in conjunction with a multi-domain/multi-layer controller or orchestrator without multi-domain/multi-layer path computation.

The bandwidth optimization systems and methods can work with current and enhanced path computation algorithm to move existing, scheduled, and expected connections to reduce resource usage costs; use knowledge of connection resource usage including number of hops, duration, bandwidth, and deviation from ideal usage in an otherwise empty network to assign a resource cost to the connection; sort connections in order of decreasing cost; relay information to a control plane or a management plane (alternatively: to management systems for manual processing) to effect moves in sort order; and performs one or multiple full or partial passes in order to maximize the bandwidth recovered per move effected.

The bandwidth optimization can reclaim stranded bandwidth by selecting connections to be moved, sorting the selected connections according to priority criteria and messaging the connection network to effect reconfigurations that decrease used bandwidth, where connections may be sorted based on how much bandwidth they may consume if not re-laid. The connections can be selected to reflect virtual network, sub-network, link, customer, or quality of service. The connections can be sorted randomly, by pure instantaneous bandwidth consumption, by pure instantaneous bandwidth consumption as modified by connection length (hops) and/or duration, by an absolute resource consumption metric as above or by relative (worst offender) consumption where a comparison is made with the resources used the by the connection in an otherwise empty network, and the like. Link weights can be determined based on current network status, where link weights are determined from static link weights by adding a penalty term which is determined by current bandwidth allocated on the link. All connections in the candidate list may be moved up to a maximum number determined apriori or set based on how much bandwidth has been reclaimed. The candidate connection list can be groomed in multiple full or partial passes as determined by an apriori bound or set based on how much bandwidth has been reclaimed The triggering can be on demand, based on a schedule, based on connection release or connection blocking, enabled or inhibited by congestion measures such as connections blocked or test calls failed, enabled or inhibited by congestion measures that are discounted to give more weight to recent events, enabled or inhibited by congestion measures such as link, subnetwork, or network utilization, etc. The connections are selected or excluded due to membership in well-defined categories such as in progress, scheduled but not active, within a common time range, part of a permanent SNC. The connections can be sorted randomly, by pure instantaneous bandwidth consumption or as modified by connection length (hops) and/or duration. The connections can be sorted by an absolute consumption metric as above or by relative (worst offender) consumption where a comparison is made with the resources used the by the connection in an otherwise empty network.

The connections can be moved to alternative paths using path computation algorithms that use various of network state information. The paths can be selected using minimum cost routing where the cost can be hops, administrative cost, or weights that include the combined influence of hops, link utilization, and bandwidth reservation levels for distinguished classes of paths. Connection resources may be committed based on network resource management policies. The connections can use alternative paths disjoint from the original path of the move candidate, or the connections can use alternative paths which can reuse part or all of the resources of the old path.

The optimization may terminate based on bounds on the number of passes of the penetration depth of the candidate list or both. All connections in the candidate list can be moved up to a maximum number determined apriori or set based on how much bandwidth has been reclaimed. The candidate connection list can be groomed in multiple full or partial passes as determined by an apriori bound or set based on how much bandwidth has been reclaimed. The optimization may be performed off-line and/or on a live network.

SDN Controller/Service for the Application

Figure 8:
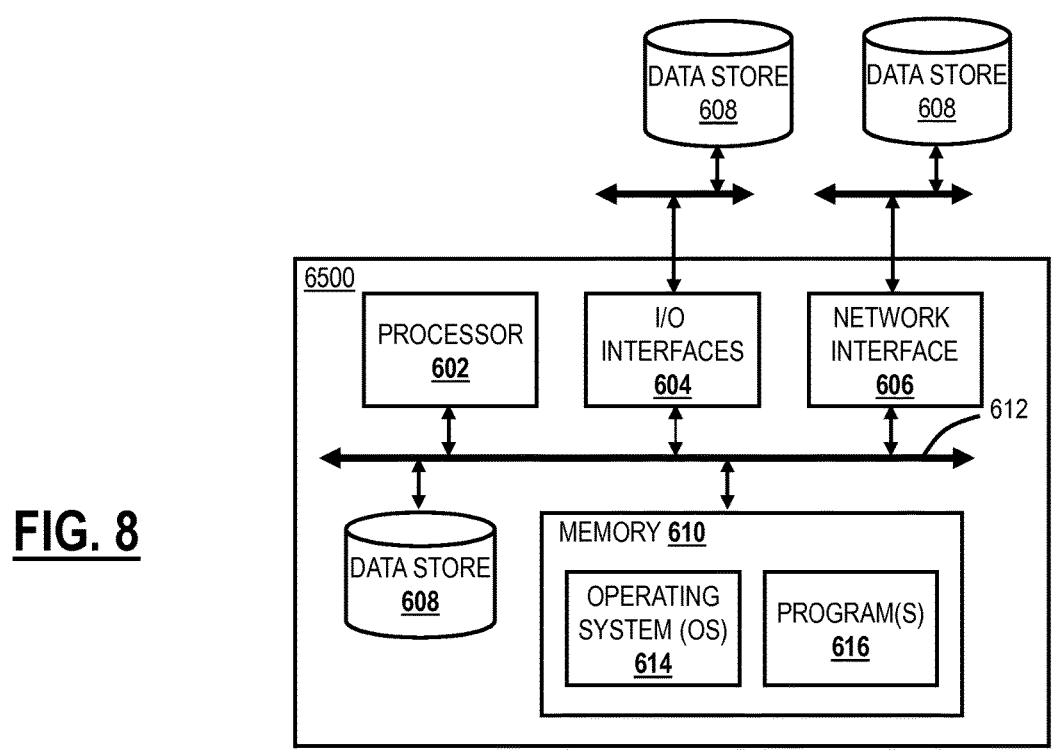
FIG. 8 is a block diagram of a server such as for the SDN controller.

Referring to FIG. 8, in an exemplary embodiment, a block diagram illustrates a server 600 such as for the SDN controller 150. The server 600 can be a digital computer that, in terms of hardware architecture, generally includes a processor 602, input/output (I/O) interfaces 604, a network interface 606, a data store 608, and memory 610. It should be appreciated by those of ordinary skill in the art that FIG. 8 depicts the server 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 can include address, control, and/or data connections to enable appropriate communications among the aforementioned components.

The processor 602 is a hardware device for executing software instructions. The processor 602 can be any custom made or commercially available processor, a central processing unit (CPU), an auxiliary processor among several processors associated with the server 600, a semiconductor-based microprocessor (in the form of a microchip or chip set), or generally any device for executing software instructions. When the server 600 is in operation, the processor 602 is configured to execute software stored within the memory 610, to communicate data to and from the memory 610, and to generally control operations of the server 600 pursuant to the software instructions. The I/O interfaces 604 can be used to receive user input from and/or for providing system output to one or more devices or components. User input can be provided via, for example, a keyboard, touchpad, and/or a mouse. System output can be provided via a display device and a printer (not shown). I/O interfaces 504 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 606 can be used to enable the server 600 to communicate on a network. The network interface 606 can include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 606 can include address, control, and/or data connections to enable appropriate communications on the network. A data store 608 can be used to store data. The data store 608 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 can incorporate electronic, magnetic, optical, and/or other types of storage media. In one example, the data store 608 can be located internal to the server 600 such as, for example, an internal hard drive connected to the local interface 512 in the server 600. Additionally in another embodiment, the data store 608 can be located external to the server 600 such as, for example, an external hard drive connected to the I/O interfaces 604 (e.g., SCSI or USB connection). In a further embodiment, the data store 608 can be connected to the server 500 through a network, such as, for example, a network attached file server.

The memory 610 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 610 can incorporate electronic, magnetic, optical, and/or other types of storage media. Note that the memory 610 can have a distributed architecture, where various components are situated remotely from one another, but can be accessed by the processor 602. The software in memory 610 can include one or more software programs, each of which includes an ordered listing of executable instructions for implementing logical functions. The software in the memory 610 includes a suitable operating system (O/S) 614 and one or more programs 616. The operating system 614 essentially controls the execution of other computer programs, such as the one or more programs 616, and provides scheduling, input-output control, file and data management, memory management, and communication control and related services. The one or more programs 616 may be configured to implement the various processes, algorithms, methods, techniques, etc. described herein.

In an exemplary embodiment, the SDN controller 150 can be implemented through the server 600 where the network interface 608 is communicatively coupled to one or more nodes in a network. The SDN controller 150 can also include an Application Programming Interface (API) which allows additional applications to interface with the SDN controller 150 for data associated with the network. In an exemplary embodiment, one or more applications can be implemented on the server 600 (or on the server 600 operating as the SDN controller 150) for the SDN control plane 200, and receive data through the API. Variously, the one or more applications can implement the various bandwidth optimizations described herein. Other configurations are also contemplated.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented on a server or processing device, for bandwidth optimization in a network, the method comprising:
    monitoring a state of the network, wherein the network is a connection-oriented network;
    utilizing analytics based on the monitoring to predict trends, create triggers, and determine updates to policy associated with the network; and
    performing bandwidth optimization on one or more connections based on the trends, the triggers, and the policy, wherein each of the one or more connections has one or more of a Wave Division Multiplexing (WDM) component, a Time Division Multiplexing (TDM) component, and a packet component, and wherein the bandwidth optimization finds the one or more connections with inefficient resource usages and moves the one or more connections, in one or more of time and space, to more optimal paths,
    wherein the bandwidth optimization comprises sorting candidate connections in a candidate set based on sorting criteria, for each of the candidate connections, determining if a move improves network resources, and performing multiple passes through the candidate set, and
    wherein the sorting criteria comprises one or more of:
    an absolute resource consumption metric comprising one of pure instantaneous bandwidth consumption and the pure instantaneous bandwidth consumption modified by connection length and/or duration,
    a relative consumption metric based on a comparison of resources used by the candidate connections in an otherwise empty network, and
    priority of the candidate connections.

2. The method of claim 1, wherein the network utilizes Software Defined Networking (SDN) control, and the method is performed by one of an SDN controller and an SDN application.

3. The method of claim 1, wherein the one or more connections are any of existing connections, scheduled connections, and forecasted connections.

4. The method of claim 1, wherein inputs for the monitoring comprise a topology of the network, a connection state for connections in the network, historical traffic data, and the policy comprising how to filter and select the one or more connections and when to terminate the bandwidth optimization.

5. The method of claim 1, wherein the monitoring is one or more of passive monitoring and active monitoring.

6. The method of claim 1, wherein the trends are predicted based on historical traffic data to determine traffic predictions and the traffic predictions are used by the bandwidth optimization to determine relocation of the one or more connections,
    wherein the triggers are generated in response to one or more of changes in network topology and capacity and the triggers are used to determine when the bandwidth optimization is performed, and
    wherein the updates to the policy comprise updates, based on analytics, to filtering and selection of the one or more connections and when to terminate the bandwidth optimization.

7. The method of claim 1, wherein the bandwidth optimization adds temporary resources in the network to accommodate moves of the one or more connections.

8. The method of claim 1, wherein the network comprises one or more of a plurality of domains and a plurality of layers.

9. The method of claim 1, wherein the bandwidth optimization comprises:
    for each candidate connection in a candidate set, moving to an ideal path by first clearing enough resources from the path to permit the moving; and
    effecting all of the moving if total resources are decreased.

10. An apparatus configured to perform bandwidth optimization in a network, the apparatus comprising:
    a network interface and a processor communicatively coupled to one another; and
    memory storing instructions that, when executed, cause the processor to
        monitor a state of the network via the network interface, wherein the network is a connection-oriented network,
        utilize analytics based on the state to predict trends, create triggers, and determine updates to policy associated with the network, and
        determine bandwidth optimization on one or more connections based on the trends, the triggers, and the policy, wherein each of the one or more connections has one or more of a Wave Division Multiplexing (WDM) component, a Time Division Multiplexing (TDM) component, and a packet component, and wherein the bandwidth optimization finds the one or more connections with inefficient resource usages and moves the one or more connections, in one or more of time and space, to more optimal paths,
        wherein, to perform the bandwidth optimization, the memory storing instructions that, when executed, cause the processor to sort candidate connections in a candidate set based on sorting criteria, for each of the candidate connections, determine if a move improves network resources, and perform multiple passes through the candidate set, and wherein the sorting criteria comprises one or more of:

an absolute resource consumption metric comprising one of pure instantaneous bandwidth consumption and the pure instantaneous bandwidth consumption modified by connection length and/or duration, a relative consumption metric based on a comparison of resources used by the candidate connections in an otherwise empty network, and priority of the candidate connections.

11. The apparatus of claim 10, wherein the network comprises one or more of a plurality of domains and a plurality of layers.

12. The apparatus of claim 10, wherein the network utilizes Software Defined Networking (SDN) control, and the method is performed by one of an SDN controller and an SDN application.

13. The apparatus of claim 10, wherein the one or more connections are any of existing connections, scheduled connections, and forecasted connections.

14. The apparatus of claim 10, wherein inputs to monitor the state comprise a topology of the network, a connection state for connections in the network, historical traffic data, and the policy comprising how to filter and select the one or more connections and when to terminate the bandwidth optimization.

15. The apparatus of claim 10, wherein the trends are predicted based on historical traffic data to determine traffic predictions and the traffic predictions are used by the bandwidth optimization to determine relocation of the one or more connections, wherein the triggers are generated in response to one or more of changes in network topology and capacity and the triggers are used to determine when the bandwidth optimization is performed, and wherein the updates to the policy comprise updates, based on analytics, to filtering and selection of the one or more connections and when to terminate the bandwidth optimization.

16. The apparatus of claim 10, wherein the bandwidth optimization adds temporary resources in the network to accommodate moves of the one or more connections.

17. The apparatus of claim 10, wherein, to perform the bandwidth optimization, the memory storing instructions that, when executed, cause the processor to for each candidate connection in a candidate set, move to an ideal path by first clearing enough resources from the path to permit the moving, and cause movement to the ideal paths if total resources are decreased.

18. A Software Defined Networking (SDN) network, comprising:

a plurality of network elements interconnected to one another;

an SDN controller communicatively coupled to one or more of the plurality of network elements; and an SDN application executed on a processor configured to monitor a state of the network based on communication with the SDN controller, wherein the network is a connection-oriented network, utilize analytics based on the state to predict trends, create triggers, and determine updates to policy associated with the network, and determine bandwidth optimization on one or more connections based on the trends, the triggers, and the policy, wherein each of the one or more connections has one or more of a Wave Division Multiplexing (WDM) component, a Time Division Multiplexing (TDM) component, and a packet component, and wherein the bandwidth optimization finds the one or more connections with inefficient resource usages and moves the one or more connections, in one or more of time and space, to more optimal paths, wherein, to perform the bandwidth optimization, the processor is configured to sort candidate connections in a candidate set based on sorting criteria, for each of the candidate connections, determine if a move improves network resources, and perform multiple passes through the candidate set, and wherein the sorting criteria comprises one or more of:

an absolute resource consumption metric comprising one of pure instantaneous bandwidth consumption and the pure instantaneous bandwidth consumption modified by connection length and/or duration, a relative consumption metric based on a comparison of resources used by the candidate connections in an otherwise empty network, and priority of the candidate connections.

* * * * *